US012110138B2

(12) United States Patent
Deng et al.

(10) Patent No.: US 12,110,138 B2
(45) Date of Patent: Oct. 8, 2024

(54) TRANS-MEDIA UNMANNED AERIAL VEHICLE DEVICE AND CONTROL METHOD THEREOF

(71) Applicant: NANJING UNIVERSITY OF AERONAUTICS AND ASTRONAUTICS, Nanjing (CN)

(72) Inventors: Feng Deng, Nanjing (CN); Xiaoyuan Sun, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/778,911

(22) PCT Filed: Jun. 4, 2021

(86) PCT No.: PCT/CN2021/098354
§ 371 (c)(1),
(2) Date: May 23, 2022

(87) PCT Pub. No.: WO2022/222238
PCT Pub. Date: Oct. 27, 2022

(65) Prior Publication Data
US 2024/0017854 A1     Jan. 18, 2024

(30) Foreign Application Priority Data

Apr. 23, 2021   (CN) .......................... 202110441374.7

(51) Int. Cl.
*B64U 20/50*     (2023.01)
*B64U 10/10*     (2023.01)
(Continued)

(52) U.S. Cl.
CPC ............. *B64U 20/50* (2023.01); *B64U 10/10* (2023.01); *B64U 20/75* (2023.01); *B64U 70/00* (2023.01)

(58) Field of Classification Search
CPC ........ B64U 20/50; B64U 10/10; B64U 20/75; B64U 70/00; B64U 2101/00;
(Continued)

(56) References Cited

U.S. PATENT DOCUMENTS 4,163,535 A  *  8/1979  Austin .................. B64U 10/13
                                                 244/17.11
4,478,379 A  *  10/1984 Kerr ...................... B64C 39/024
                                                 244/17.11
(Continued)

*Primary Examiner* — Medhat Badawi
(74) *Attorney, Agent, or Firm* — Jacob M. Ward; Ward Law Office LLC

(57) ABSTRACT

The present disclosure discloses a trans-media unmanned aerial vehicle device and a control method thereof. The trans-media unmanned aerial vehicle device includes a housing, and a piston which is arranged in the housing and is capable of moving in a reciprocating manner in the housing; one end of the housing is provided with an opening; several flying wings are uniformly arranged in a circumferential direction of the piston; the flying wings are rotatably connected to a side of the piston facing the opening and are spread or retracted like an umbrella; and under the pushing of the piston, the flying wings can be spread to the outside of the housing and retracted back into the housing.

19 Claims, 6 Drawing Sheets

(51) Int. Cl.
  *B64U 20/75* (2023.01)
  *B64U 70/00* (2023.01)
(58) Field of Classification Search
  CPC .... B64U 2101/30; B64U 10/13; B64U 30/20;
    B64U 50/19; B64C 39/024; B64C 1/30;
    B60F 5/02
  See application file for complete search history.

(56) References Cited

U.S. PATENT DOCUMENTS

| | | | |
|---|---|---|---|
| 6,347,764 B1* | 2/2002 | Brandon | F42B 10/58 |
| | | | 102/388 |
| 9,434,471 B2* | 9/2016 | Arlton | B64C 27/14 |
| 9,751,597 B1* | 9/2017 | Low | B64C 39/022 |
| 9,975,633 B1* | 5/2018 | Johnson | B64C 11/001 |
| 9,981,744 B2* | 5/2018 | Choo | B64C 27/50 |
| 10,054,939 B1* | 8/2018 | Applewhite | G08G 5/0008 |
| 10,093,417 B2* | 10/2018 | Meringer | B64U 70/10 |
| 10,287,010 B2* | 5/2019 | Stamps | B64U 30/293 |
| 10,336,453 B2* | 7/2019 | Chan | B64D 9/003 |
| 10,689,113 B2* | 6/2020 | Prager | B64D 1/22 |
| 10,814,968 B2* | 10/2020 | Gamble | B64C 27/52 |
| 11,524,766 B2* | 12/2022 | Campbell | B64U 30/293 |
| 11,649,051 B2* | 5/2023 | Arlton | B64C 7/00 |
| | | | 244/17.23 |
| 11,780,580 B2* | 10/2023 | Izraelevitz | F42B 10/50 |
| | | | 244/3.16 |
| 11,834,174 B2* | 12/2023 | Sikora | B64C 39/024 |
| 2006/0011777 A1* | 1/2006 | Arlton | B64U 20/50 |
| | | | 244/7 B |
| 2008/0245924 A1* | 10/2008 | Arlton | B64U 30/21 |
| | | | 244/17.23 |
| 2011/0139923 A1* | 6/2011 | Papanikolopoulos | |
| | | | B64C 39/028 |
| | | | 244/2 |
| 2012/0205488 A1* | 8/2012 | Powell | B64C 39/024 |
| | | | 244/63 |
| 2016/0167778 A1* | 6/2016 | Meringer | B64U 30/293 |
| | | | 244/17.11 |
| 2017/0247109 A1* | 8/2017 | Buchmueller | B64C 39/024 |
| 2018/0186445 A1* | 7/2018 | Fenny | B64C 27/08 |
| 2018/0312252 A1* | 11/2018 | Yates | B64U 80/70 |
| 2019/0077503 A1* | 3/2019 | Reddy | B64U 30/29 |
| 2019/0107374 A1* | 4/2019 | Hill | F42B 12/42 |
| 2019/0176983 A1* | 6/2019 | Darnell | B64D 47/04 |
| 2022/0018113 A1* | 1/2022 | Deng | F21V 33/006 |
| 2024/0017854 A1* | 1/2024 | Deng | B64U 20/50 |

* cited by examiner

(12) United States Patent

TRANS-MEDIA UNMANNED AERIAL VEHICLE DEVICE AND CONTROL METHOD THEREOF

CROSS REFERENCE TO RELATED APPLICATION

This patent application claims the benefit and priority of Chinese Patent Application No. 202110441374.7, filed on Apr. 23, 2021, and International Application No. PCT/CN2021/098354, filed on Jun. 4, 2021, the disclosures of which are incorporated by reference herein in its entirety as part of the present application.

TECHNICAL FIELD

The present disclosure relates to the technical field of trans-media operation devices, in particular to a trans-media unmanned aerial vehicle device and a control method thereof.

BACKGROUND

In recent years, aircrafts and submarines have developed rapidly. The flight performance of various types of aircrafts in the air has become more and more excellent and perfect, and the diving performance of the submarines has also been continuously developed and improved. The two types of machines are only operated in a single medium. At this time, people wonder if it is possible to combine the air flight capability of an aircraft and the diving capability of a submarine to create a water-air trans-media new concept aircraft, that is, a water-air trans-media aircraft. This kind of aircraft is a combination of a submarine and an aircraft. It can fly in the air like an aircraft, with good maneuverability and a wide visual field, and can dive in water like a submarine, with good concealment capability and underwater operation capability.

In terms of military applications, by comprehensive utilization of the reconnaissance, defense penetration, and attack capabilities of an aircraft and a submarine, a water-air trans-media aircraft can obtain a wider range of and more comprehensive enemy information under the water, on the water surface, and in the air through the trans-media characteristic; can quickly grasp the battlefield situation through the air flight capability of the aircraft, and has a broader perspective and quick defense penetration and attack capabilities; and can achieve underwater hiding, target detection and snugly attack the enemy through the dividing capability of the submarine. When the trans-media aircraft dives, the position of enemy's warships or submarines can be observed with the trans-media aircraft, so that a series of important prewar tasks such as carrying out coastal protection, breaking through blockage, achieving reconnaissance, and covering up the actions of special forces. The trans-media aircraft mainly attacks enemy's transport ship or merchant ship. It can use water as a cover to carry out concealed activities and carry out a sudden attack on the enemy. It has greater self-sufficiency, endurance and combat radius. This kind of aircraft can be far away from a base, conceal in a wider ocean area for a long time, go deep into enemy's sea area, and fight with the enemy alone, and has strong assault power. When the trans-media aircraft flies to the air from the water, it can carry explosives, missiles, torpedoes, and other devices to attack targets at the sea and the land. This trans-media aircraft can greatly improve the comprehensive combat capability of modern navies. In recent years, the Diaoyu Islands and the Huangyan Islands, which are located in the East China Sea and the South China Sea respectively, have been provoked and illegally occupied by other countries. The maritime conflicts have become increasingly tense. The increasing competitions and conflicts in the offshore areas of the national territory make trans-media aircrafts have received much attention. Therefore, the research on trans-media aircrafts has huge potential application value and strategic significance in China.

In terms of civil applications, this kind of aircraft also has huge economic benefits and practical application significance. This kind of water-air trans-media unmanned aerial vehicle can not only detect various natural disasters such as fire, flood and shipwreck in the air like an unmanned aerial vehicle, but also achieve a series of tasks, such as monitoring the water quality, researching the marine science, salvaging belongings, carrying out exploration and exploitation, carrying out scientific detection, maintaining equipment, carrying out search and rescue, repairing submarine cables, implementing underwater sightseeing and academic research, like an underwater detector or a submarine. Only one trans-media aircraft can realize various functions and tasks of multiple media in multiple aspects that are currently realized by multiple sets of equipment, which greatly improves the work efficiency, saves the production cost of various types of equipment, and realizes "multiple purposes in one machine".

In order to develop this kind of trans-media unmanned aerial vehicle, many people, teams, and institutions have proposed many design methods at present, including the "Cormorant" submarine-launched unmanned aerial vehicle of the U.S., the "Maritime Searcher" unmanned aerial vehicle of the U.S., and the "XFC submarine-launched unmanned aerial vehicle" developed by the U.S. Naval Research Laboratory. Siddall, et al. of Imperial College London used a bionic animal to design and develop a paddle-propelled booby-like amphibious aircraft "Aqua-Mav". North Carolina State University and Tridan Science and Imaging Corporation jointly developed the "Eagle Ray" fixed-wing trans-media aircraft. Beihang University developed a booby-like water-air amphibious trans-media unmanned aerial vehicle. Liao Baoquan, Feng Jinfu, et al. in Air Force Engineering University proposed a trans-media aircraft that changes shape by folding up wings twice.

According to a basic solution, to enter water, the aircraft dives into the water by folding the wings through a transformation structure; and to leave the water, the aircraft emerges from the water by changing its density, then adjusts its posture, and is launched out of the water by own power or a carrier. In a takeoff process, the wings are unfolded through the transformation structure and transformed into fixed wings for flight.

When it enters water, the existing trans-media unmanned aerial vehicle generally dives into the water by folding the wings (such as various forms shown in FIG. 1 of the accompanying drawings of the specification), and when it leaves the water, the existing trans-media unmanned aerial vehicle relies on its own power device (such as a water pump, and a chemical reaction device) or a carrier (a catapult, a torpedo launcher, or a small rocket booster). Although the entire trans-media process can be completed, these designs have some common shortcomings: 1) In the diving process, high-altitude diving causes great damage to the structure of the folding device. 2) This kind of trans-media aircraft is a single-pass trans-media aircraft, which cannot be used until it is adjusted after one launching. 3) When it is transformed into a fixed-wing flight state after leaving the water, this aircraft has a higher control requirement, that is, the control difficulty is high.

SUMMARY

The present disclosure aims to provide a trans-media unmanned aerial vehicle device and a control method thereof, so as to solve the problems in the above prior art. A movable piston is arranged in a housing; the piston is rotatably connected with flying wings. The flying wings can be spread towards the outside of the housing under the push action of the piston, and can be retracted into the housing, thus completing transformation of different forms in water and air. When the trans-media unmanned aerial vehicle device leaves water and enters water, the flying wings are retracted in the housing and are protected by the housing to avoid damage. During a flight, the flying wing can be smoothly spread to ensure a flight state.

In order to achieve the above-mentioned purpose, the present disclosure provides the following solution:

The present disclosure provides a trans-media unmanned aerial vehicle device, including a housing, and a piston which is arranged in the housing and is capable of moving in a reciprocating manner in the housing; one end of the housing is provided with an opening; several flying wings are uniformly arranged in a circumferential direction of the piston; the flying wings are rotatably connected to a side of the piston facing the opening and are spread or retracted like an umbrella; and under the pushing of the piston, the flying wings can be spread to the outside of the housing and retracted back into the housing.

Preferably, the piston includes a piston head, a piston tail, and a piston rod for connecting the piston head to the piston tail; and the piston tail is located outside the housing and is capable of closing the housing.

Preferably, after the housing and the piston tail are buckled, the whole is formed into a spindle shape; the piston head is of a hollow structure; and the mass of the piston tail is greater than that of the piston head.

Preferably, the piston tail has an adjustable density.

Preferably, each flying wing includes a rotating rod, and a rotor blade arranged at a free end of the rotating rod; and the rotating rod is provided with a magnetic structure that attracts the rotor blade.

Preferably, a mounting slot is formed in the piston head; the mounting slot has an axial limiting wall and a radial limiting wall; and the rotating rod is hinged in the mounting slot.

Preferably, there are four rotating rods which are distributed in a cross shape.

Preferably, the piston is connected with a power unit; the power unit includes a piston aeroengine and a hydraulic system driven by the piston aeroengine; and the hydraulic system is controlled to push the piston to move.

The present disclosure further provides a control method for the trans-media unmanned aerial vehicle device.

When leaving water, the unmanned aerial vehicle device is launched from the water to the air; when the device rises to a certain height, the piston moves towards the outside of the housing relative to the housing, and the flying wings extend out of the housing and are spread.

When entering water, the flying wings are downwards retracted, and the piston moves towards the inside of the housing relative to the housing; the flying wings are retracted back into the housing; and the unmanned aerial vehicle device freely falls into the water.

Preferably, when leaving the water, the unmanned aerial vehicle device is launched out of the water in a vertical state; and when entering the water, the unmanned aerial vehicle device falls into the water in the vertical state.

Compared with the existing art, the following technical effects are achieved in the present disclosure.

According to the present disclosure, the movable piston is arranged in the housing; the piston is rotatably connected with the flying wings. The flying wings can be spread towards the outside of the housing under the push action of the piston, and can be retracted into the housing, thus completing transformation of different forms in water and air. When the unmanned aerial vehicle device leaves water and enters water, the flying wings are retracted in the housing and are protected by the housing to avoid damage. During a flight, the flying wings can be smoothly spread to ensure a flight state.

According to the present disclosure, the piston includes the piston head which moves in the housing and the piston tail which moves outside the housing. When the flying wings are retracted in the housing, the housing can be closed by the piston tail to further ensure the safety of the structures or components, including the flying wings, in the housing. In a flight state in the air, the piston tail can also form a counterweight structure of the unmanned aerial vehicle device to further ensure the fight stability of the unmanned aerial vehicle device.

According to the present disclosure, after the housing and the piston tail are buckled, the whole is formed into the spindle shape. The higher mass of the piston tail makes the overall gravity center located at the lower part. Therefore, the unmanned aerial vehicle device will be in the vertical state after being released. When the unmanned aerial vehicle device leaves the water and enters the water, the resistance of the water can be reduced, thus ensuring successful leaving and ensuring that the flying wings are smoothly spread for flight after the unmanned aerial vehicle device leaves the water; and the impact on the unmanned aerial vehicle device when it enters the water can also be reduced. In addition, the piston head is of the hollow structure, so that it can be used as a loading space for some devices and equipment.

According to the present disclosure, each flying wing includes the rotating rod, and the rotor blade arranged at the free end of the rotating rod, so that the unmanned aerial vehicle device can fly through the air with the rotor structures. Further, there are four rotating rods, that is, four rotor structures are adopted, so that accurate control can be achieved, and the flight stability and controllability are ensured.

According to the present disclosure, the piston tail has the adjustable density. The position of the unmanned aerial vehicle device in water can be controlled, i.e., floating up or diving down, by adjusting the size of the density of the piston tail. That is, the position of the unmanned aerial vehicle device in the water can be controlled.

BRIEF DESCRIPTION OF THE DRAWINGS

In order to describe embodiments of the present disclosure or technical solutions in the existing art more clearly, drawings required to be used in the embodiments will be briefly introduced below. It is apparent that the drawings in the descriptions below are only some embodiments of the present disclosure. Those of ordinary skill in the art also can obtain other drawings according to these drawings without making creative work.

Figure 1:
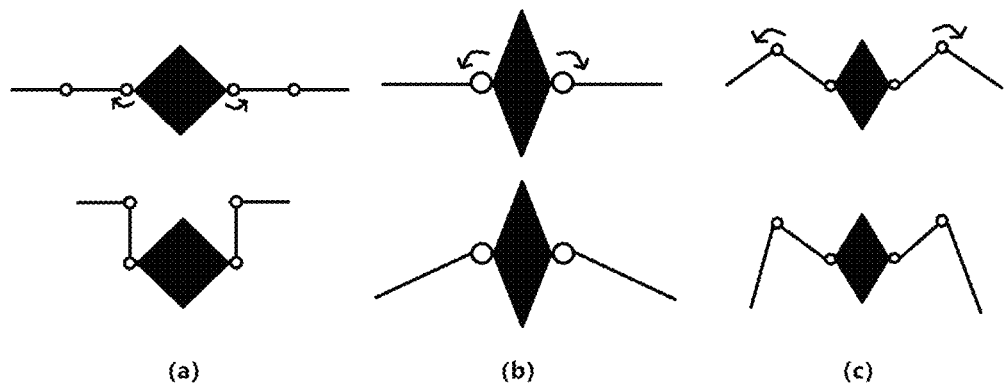
FIG. 1 is a schematic diagram of spreading and folding wings through a transformation structure in the prior art.
Figure 2:
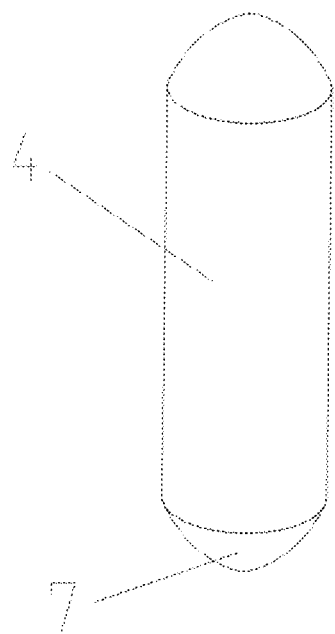
FIG. 2 is a schematic diagram illustrating that the present disclosure is in water, just leaves the water, or just enters the water and is not opened.
Figure 3:
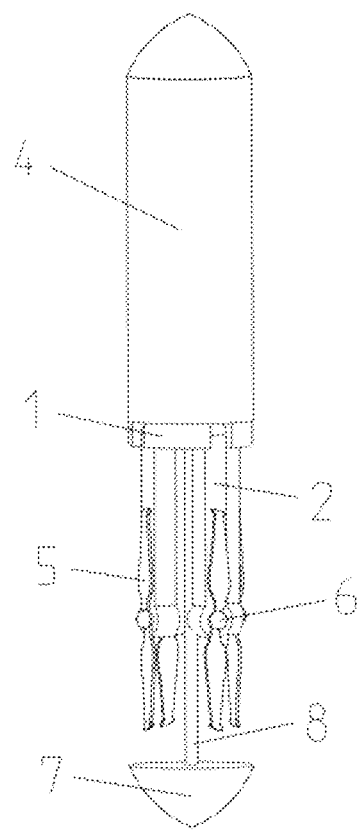
FIG. 3 is a schematic diagram of a state that a piston moves outwards or inwards in the air according to the present disclosure.
Figure 4:
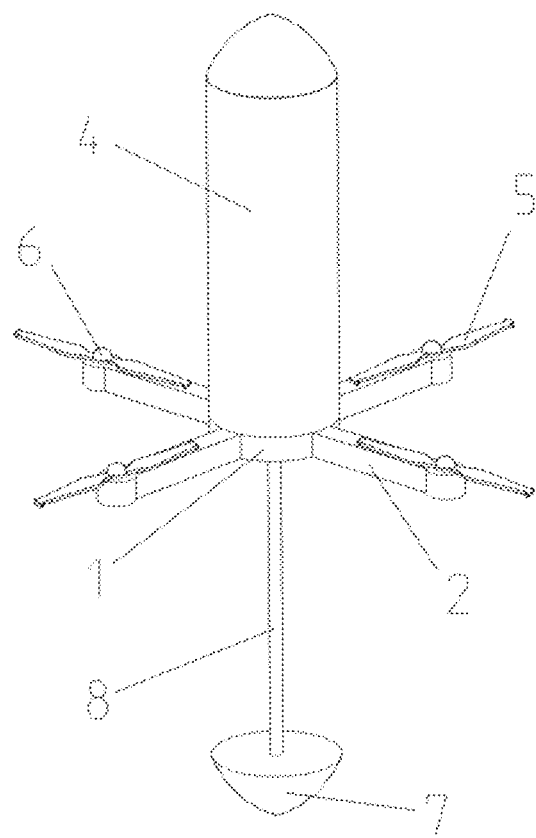
FIG. 4 is a schematic diagram of a state that rotating rods and rotor blades are spread in place according to the present disclosure.
Figure 5:
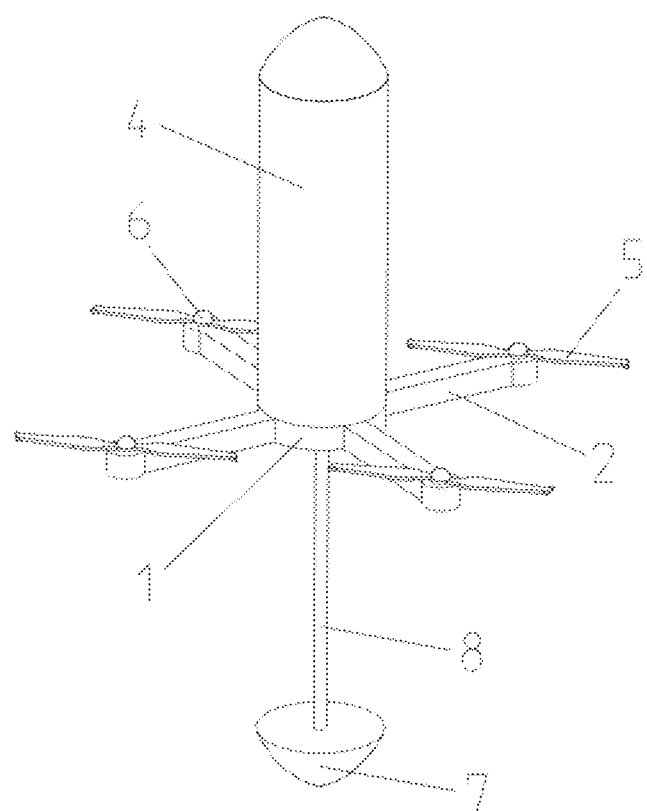
FIG. 5 is a schematic diagram of a state that rotor blades rotate according to the present disclosure.
Figure 6:
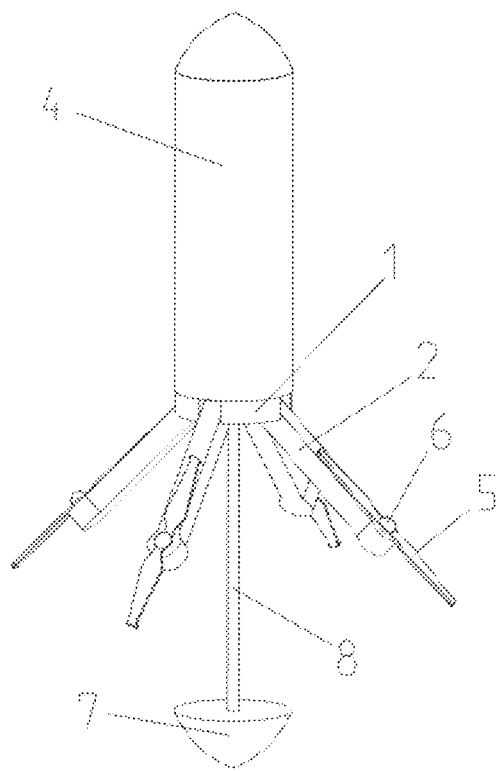
FIG. 6 is a schematic diagram of a state that rotor blades stop rotating and are retracted together with the rotating rods according to the present disclosure.
Figure 7:
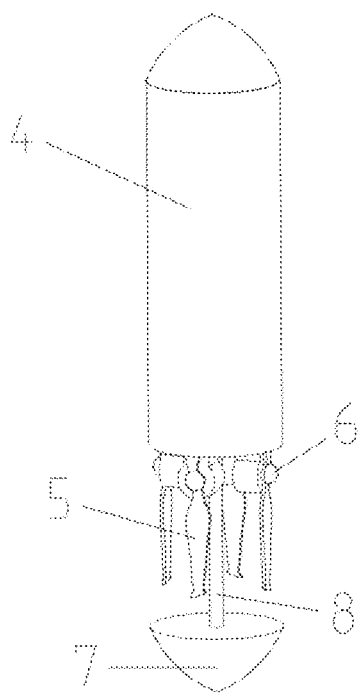
FIG. 7 is a schematic diagram of a state that a piston starts to move outwards or is going to be inwards recovered in place according to the present disclosure.

In the drawings: 1: piston head; 2: rotating rod; 3: pin; 4: housing; 5: rotor blade; 6: screw shaft; 7: piston tail; 8: piston rod; 9: radial limiting wall; 10: axial limiting wall.

DETAILED DESCRIPTION

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments derived from the embodiments of the present disclosure by a person of ordinary skill in the art without creative efforts shall fall within the protection scope of the present disclosure.

An objective of the present disclosure is to provide a method and system for global stabilization control of a hypersonic vehicle that enable the global stabilization control of a non-minimum phase hypersonic vehicle.

To make the above-mentioned objective, features, and advantages of the present disclosure clearer and more comprehensible, the present disclosure will be further described in detail below in conjunction with the accompanying drawings and specific embodiments.

The following clearly and more completely describes the technical solution in the embodiments of the present disclosure in combination with the accompanying drawings of the embodiments of the present disclosure. Apparently, the described embodiments are only part of the embodiments of the present disclosure, not all embodiments. Based on the embodiments in the present disclosure, all other embodiments obtained by those of ordinary skill in the art without creative work shall fall within the protection scope of the present disclosure.

The present disclosure aims to provide a trans-media unmanned aerial vehicle device and a control method thereof, so as to solve the problems in the above prior art. A movable piston is arranged in a housing; the piston is rotatably connected with flying wings. The flying wings can be spread towards the outside of the housing under the push action of the piston, and can be retracted into the housing, thus completing transformation of different forms in water and air. When the trans-media unmanned aerial vehicle device leaves water and enters water, the flying wings are retracted in the housing and are protected by the housing to avoid damage. During a flight, the flying wings can be smoothly spread to ensure a flight state.

In order to make the above-mentioned purposes, characteristics, and advantages of the present disclosure more obvious and understandable, the present disclosure is further described in detail below with reference to the accompanying drawings and specific implementations.

As shown in FIGS. 2-8, the present disclosure provides a trans-media unmanned aerial vehicle device, including a housing 4, and a piston which is arranged in the housing 4 and is capable of moving in a reciprocating manner in the housing 4. The housing 4 is of a semi-closed structure, with an opening in one end, and has a certain thickness and supporting capacity. An outer surface of the housing 4 can be set to be smoother, without excessive bulges, so as to reduce resistance of water and air when the unmanned aerial vehicle device leaves water and enters water. The entire housing 4 can be of a cylindrical structure which may have a circular, rectangular, or polygonal section, and is set to be a centrosymmetric structure as much as possible. In this way, the gravity center of the unmanned aerial vehicle device can be kept at the position of a center axis, and the unmanned aerial vehicle device can be kept in a vertical state when it moves in water or air. A propulsion device or wings and the other structures can also be provided on an outer wall of the housing 4. When the housing 4 is closed, a certain thrust can also be obtained, and the heading direction can be changed. The piston has a certain length in a moving direction. When the piston slides in the housing 4, the piston can be kept overlapping an axial direction of the housing 4, thus keeping stable sliding. Furthermore, the piston cannot hermetically contact an inner wall of the housing 4 (at this time, the piston can be connected to a driving device for driving, instead of indirect driving by an air pressure or a liquid pressure). In addition, since the piston capable of moving in the reciprocating manner is arranged in the housing 4, the housing 4 shall axially have a certain length. A power unit that pushes the piston to move can be installed. The power unit can be a pneumatic or hydraulic telescopic cylinder structure (or directly fill a cavity of the housing 4 with an air pressure or liquid pressure to drive the piston), or the piston can also be driven directly by an engine, or a motor device, or a screw and nut structure, etc.; and the power unit can be installed inside the housing 4 and protected by the housing 4. Several flying wings are uniformly arranged in a circumferential direction of the piston. The flying wings can be power-driven structures such as rotors and jet wings. The power-driven structure is connected with a rotary driving device or a jet device. Each flying wing can be provided with an independent power-driven structure. The setting of the flying wings should not hinder the movement of the piston in the housing 4. For this reason, the flying wings can be rotatably connected to a side of the piston facing the opening. The flying wings can rotate around the piston and can be spread or retracted like an umbrella. After being spread, the flying wings are outwards radial relative to the piston. After being retracted, the flying wings are basically parallel to the axial direction of the piston. Furthermore, the diameter after the retraction shall be less than an inner diameter of the housing 4. It should be noted that the rotation of the flying wings around the piston can be automatically controlled or other passive control methods can be used. For example, the motor can be used to actively drive the flying wings to rotate. Spreading or retraction can be achieved by changing clockwise and anticlockwise rotations, or a reset mechanism such as a reset spring can be provided. Active driving is required only in one direction. In the other direction, the flying wings can be automatically reset according to a setting by the elastic force of the reset spring. Under the push of the piston, when the unmanned aerial vehicle device turns into the flight state, the piston moves towards the opening of the housing 4 at this time, and the flying wings can move out to the outside of the housing 4 and can be then spread radially. When the unmanned aerial vehicle device needs to enter the water, it needs to stop the flight state, that is to say, the flying wings need to be retracted back into the housing 4. At this time, the piston moves to the inside of the housing 4, and the flying wings are first retracted around the axial direction of the piston and then retracted back into the housing 4 with the movement of the piston. Therefore, the present disclosure can complete transformation of different forms in water and air. When the unmanned aerial vehicle device leaves water and enters water, the flying wings are retracted in the housing 4 and are protected by the housing 4 to avoid damage. In a flight, the flying wings can be smoothly spread to ensure the flight state.

The piston may include a piston head 1, a piston tail 7, and a piston rod 8 for connecting the piston head 1 to the piston tail 7. The piston head 1 is arranged in the housing 4 and is slidably connected to the inner wall of the housing 4, and the piston tail 7 is located outside the housing 4 and can close the housing 4. A diameter of the piston rod 8 is less than that of the piston head 1 and the piston tail 7, so as to save a space occupied by the housing 4, provide a space for the recovery of the flying wings, and reduce the weight of the whole device. The piston tail 7 can be used as a cover of the housing 4. When the flying wings are retracted in the housing 4, the piston tail 7 can be used to close the housing 4, which further ensures the safety of the structures or components, including the flying wings, in the housing 4. In the flight state in the air, the piston tail 7 can also form a counterweight structure for the unmanned aerial vehicle device to further ensure the flight stability of the unmanned aerial vehicle device.

After the housing 4 and the piston tail 7 are buckled, the whole can be formed into a spindle shape, that is, a structural form with two sharp ends. Moreover, the mass of the piston tail 7 is greater than that of the piston head 1. At this time, the gravity center of the entire piston is at the lower part, and correspondingly, the gravity center of the entire unmanned aerial vehicle device is at the lower part. Therefore, the unmanned aerial vehicle device will be in a vertical state when it is released in water or freely falls in the air. The piston head 1 is located at an upper part of the piston tail 7. When the unmanned aerial vehicle device leaves the water and enters the water, the housing 4 of the spindle-shaped structure can reduce the resistance of the water, thus ensuring successful leaving and ensuring that the flying wings are smoothly spread for flight after the unmanned aerial vehicle device leaves the water; and the impact on the unmanned aerial vehicle device when it enters the water can also be reduced. In addition, the piston head 1 can also be of the hollow structure, so that its inside can be used as a loading space for some devices and equipment. In conclusion, when the unmanned aerial vehicle device of the present disclosure moves in the water or in the air, the resistance of the air can be effectively reduced.

Further, the piston tail 7 has an adjustable density. An adjustment method can adopt the existing adjustment method similar to that of a submarine. For example, a water storage cabin can be arranged in the piston tail 7. The water storage cabin is communicated to external water. The size of the density of the piston tail 7 is changed by inflow and outflow of water of the water storage cabin. The position of the unmanned aerial vehicle device in the water can be controlled, i.e., floating up or diving down, by adjusting the density of the piston tail 7. That is, the position of the unmanned aerial vehicle device in the water can be controlled. A propeller or a vane can also be provided on a side wall of the piston tail 7 or a side wall of the housing 4, which can adjust the state and lateral position of the unmanned aerial vehicle device in the water. Furthermore, after the unmanned aerial vehicle enters the air, the attitude in the air can also be adjusted using the propeller or vane.

As shown in FIGS. 3-8, each flying wing can include a rotating rod 2. A free end of the rotating rod 2 is provided with a rotor blade 5. The rotor blade 5 can rotate on the rotating rod 2 and can be mounted by a screw shaft 6. The screw shaft 6 is connected with a driving structure such as a driving motor or an engine, and the driving structure can be mounted on the rotating rod 2. The rotor blades 5 have a large difference in widths and lengths, have a function of providing a lift after they are spread, and can be smoothly retracted back into the housing 4 by changing their positions. In order to ensure that the rotor blades 5 can be smoothly retracted (swing to the same direction as the lengthwise direction of the rotating rods 2). The rotating rods 2 can be provided with magnetic structures that attract the rotor blades 5. For example, magnetic materials (magnets) are provided on blades of the rotor blades 5, and the rotating rods 2 are correspondingly provided with magnets (or magnetic materials). When the rotor blades 5 lose the power of the driving structure, they gradually stop rotating and are attracted to be in the same direction as the rotating rods 2. In order to avoid the influence of magnetic adsorption on the normal rotation of the rotor blades 5, an electromagnetic material can be selected. When the rotor blades 5 operate normally, they do not have magnetism. In addition, a mechanical limit structure can also be arranged on each rotating rod 2. The mechanical limit structure can be spread and retracted. After the rotor blade 5 loses the power, the limit structure is controlled to be spread to block and limit the position of the rotor blade 5, so that the wing is in the same direction as the rotating rod 2.

Figure 8:
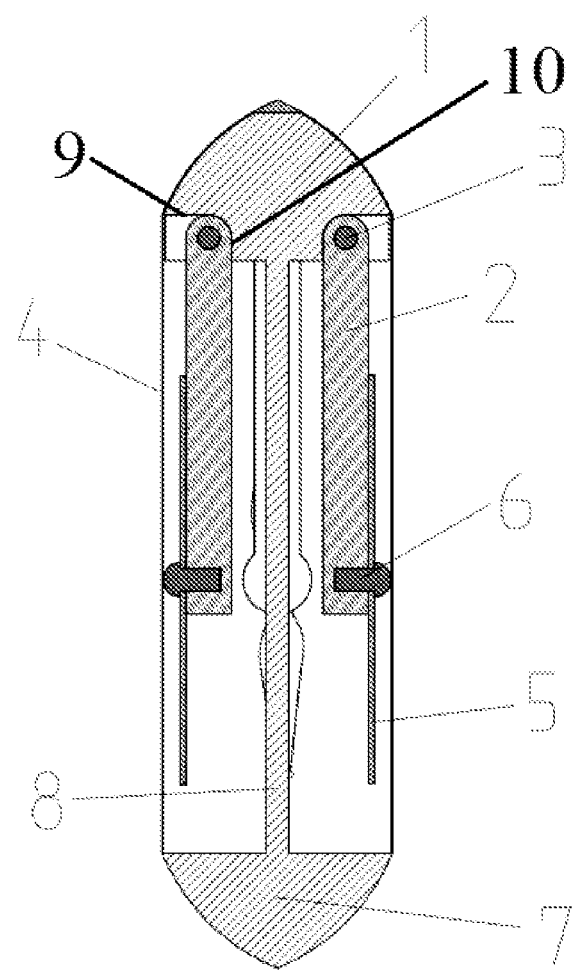
FIG. 8 is a schematic diagram of a sectional structure of the present disclosure.

As shown in FIG. 8, the piston head 1 is provided with mounting slots along radial and axial directions. Each mounting slot has an axial limiting wall 10 and a radial limiting wall 9. There are a plurality of mounting slots which are circumferentially uniformly provided in the radial direction. The rotating rods 2 are hinged in the mounting slots by pins 3. The pins 3 are arranged in the mounting slots to support the rotation of the rotating rods 2, so that action states of umbrella-like opening and closing. Furthermore, the rotation range of the rotating rods 2 can be limited under the action of the axial limit walls and the radial limit walls, so that the rotating rods 2 stop rotating after rotating in place, and two position states, i.e., an spread position and a retracted position, can be obtained to achieve spreading and retraction purposes. It should be noted that, for a rotating power source of the rotating rods 2, the motor can be used to actively drive the rotating rods to rotate. Spreading or retraction can be achieved by changing clockwise and anticlockwise rotations, or a reset mechanism such as a reset spring can be provided. Active driving is required only in one direction. In the other direction, the rotating rods can be automatically reset according to a setting. Furthermore, an automatic control method can be used to control the rotation of the rotating rods 2. A control device is arranged on the unmanned aerial vehicle device, and can receive an external control signal and also send a control instruction to an internal device. After the rotating rods 2 extend out of the housing 4, the rotating rods 2 are automatically activated to do a rotatable spreading action. When the rotating rods are required to be recovered, the rotating rods 2 are automatically controlled to do a rotatable retraction action. In addition, the rotation of the rotor blades 5, the movement of the piston, and the like can be controlled by the control device in a unified manner.

As shown in FIGS. 3-7, there may be four rotating rods 2, which are distributed in a cross shape, and each rotating rod 2 is provided with one rotor blade 5. Therefore, the present invention can adopt a four-rotor-wing structure by setting four rotating rods 2. The unmanned aerial vehicle with the four-rotor-wing structure has been used as an existing mature technology and can be controlled more accurately, so that the unmanned aerial vehicle device of the present disclosure can more effectively ensure the flight stability and controllability.

The piston is connected with a power unit. The power unit may include a piston aeroengine, and a hydraulic system driven by the piston aeroengine. The piston aeroengine directly drives the hydraulic system through one cycle of four strokes: an intake stroke, a compression stroke, an expansion stroke, and an exhaust stroke. The hydraulic system is controlled to push the piston to move.

As shown in FIGS. 2-7, the present disclosure further provides a control method for a trans-media unmanned aerial vehicle device.

When the trans-media unmanned aerial vehicle device leaves water, it can be released from a submarine, change its own density, and emerge from the water. Its own power device or rocket carrier can be used to launch the unmanned aerial vehicle device to the air from the water (It can be launched in the water by a nuclear submarine using a torpedo launcher or a missile launcher, or a rocket booster can be mounted for launching, or a water pump sprays water for launching, or chemical reactions generate a large amount of gas used as a power source). It should be noted that due to the gravity center of the unmanned aerial vehicle device itself, the vertical state can be maintained after the unmanned aerial vehicle device is released, or the vertical state can be maintained through attitude adjustment (such as a rocket-like jet structure or a propeller structure). When the unmanned aerial vehicle device rises to a certain height, the piston moves to the outside of the housing 4 relative to the housing 4, and the flying wings (the preferred structures of the rotating rods 2 and the rotor blades 5 of the present disclosure) extend out to the outside the housing 4 and are gradually spread like an umbrella. Then, the rotor blades 5 start to rotate. At this time, the unmanned aerial vehicle device is transformed into a conventional quad-rotor unmanned aerial vehicle. Compared with some existing trans-media aircraft that uses fixed wings for flight, the rotor unmanned aerial vehicle of the present disclosure is easier to control.

When the unmanned aerial vehicle device enters water, the flying wings (the preferred structures of the rotating rods 2 and the rotor blades 5 of the present disclosure. The rotor blades 5 lose the power first and gradually stop rotating) are retracted downwards to their original states (which are basically in the same direction as the lengthwise direction of the housing 4). The piston moves towards the inside of the housing 4 relative to the housing 4. The flying wings are retracted back into the housing 4, so that the whole unmanned aerial vehicle device is packed up and recovered to an initial structural form in water. The unmanned aerial vehicle device freely falls into the water, and waits for being collected by the submarine. In this way, the trans-media unmanned aerial vehicle device completes a cycle of entering water and leaving water.

Further, when leaving the water, the unmanned aerial vehicle device can use its own gravity center setting or density adjustment to vertically float on the water like a buoy that is a fishing gear; and when entering the water, the unmanned aerial vehicle device can vertically float on the water or dive into the water. The unmanned aerial vehicle device maintains the vertical state when it leaves the water and enters the water, so that the resistance of the water can be reduced, thus ensuring successful leaving and ensuring that the flying wings are smoothly spread for flight after the unmanned aerial vehicle device leaves the water; and the impact on the unmanned aerial vehicle device when it enters the water can also be reduced.

The embodiments are described herein in a progressive manner. Each embodiment focuses on the difference from another embodiment, and the same and similar parts between the embodiments may refer to each other. Since the system disclosed in an embodiment corresponds to the method disclosed in another embodiment, the description is relatively simple, and reference can be made to the method description.

The principle and implementation modes of the present disclosure are described by applying specific examples in the present disclosure. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of this specification shall not be deemed as limitations to the present disclosure.

What is claimed is:

1. A trans-media unmanned aerial vehicle device, comprising:
   a housing, and
   a piston arranged in the housing and capable of reciprocating in the housing,
   wherein one end of the housing is provided with an opening; several flying wings are uniformly arranged in a circumferential direction of the piston; the flying wings are rotatably connected to a side of the piston facing the opening and configured to spread or retract; and under the pushing of the piston, the flying wings spread to an outside of the housing and retract back into the housing upon release of the piston, wherein the piston comprises a piston head, a piston tail, and a piston rod for connecting the piston head to the piston tail; and the piston tail is located outside the housing and is capable of closing the housing.

2. The trans-media unmanned aerial vehicle device of claim 1, wherein after the housing and the piston tail are buckled, the whole is formed into a spindle shape; the piston head is of a hollow structure; and a mass of the piston tail is greater than that of the piston head.

3. The trans-media unmanned aerial vehicle device of claim 2, wherein the piston tail has an adjustable density.

4. The trans-media unmanned aerial vehicle device of claim 1, wherein each flying wing comprises a rotating rod, and a rotor blade arranged at a free end of the rotating rod; and the rotating rod is provided with a magnetic structure that attracts the rotor blade.

5. The trans-media unmanned aerial vehicle device of claim 1, wherein each flying wing comprises a rotating rod, and a rotor blade arranged at a free end of the rotating rod; and the rotating rod is provided with a magnetic structure that attracts the rotor blade.

6. The trans-media unmanned aerial vehicle device of claim 2, wherein each flying wing comprises a rotating rod, and a rotor blade arranged at a free end of the rotating rod; and the rotating rod is provided with a magnetic structure that attracts the rotor blade.

7. The trans-media unmanned aerial vehicle device of claim 3, wherein each flying wing comprises a rotating rod, and a rotor blade arranged at a free end of the rotating rod; and the rotating rod is provided with a magnetic structure that attracts the rotor blade.

8. The trans-media unmanned aerial vehicle device of claim 4, wherein a mounting slot is formed in the piston head; the mounting slot has an axial limiting wall and a radial limiting wall; and the rotating rod is hinged in the mounting slot.

9. The trans-media unmanned aerial vehicle device of claim 5, wherein a mounting slot is formed in the piston head; the mounting slot has an axial limiting wall and a radial limiting wall; and the rotating rod is hinged in the mounting slot.

10. The trans-media unmanned aerial vehicle device of claim 6, wherein a mounting slot is formed in the piston head; the mounting slot has an axial limiting wall and a radial limiting wall; and the rotating rod is hinged in the mounting slot.

11. The trans-media unmanned aerial vehicle device of claim 7, wherein a mounting slot is formed in the piston head; the mounting slot has an axial limiting wall and a radial limiting wall; and the rotating rod is hinged in the mounting slot.

12. The trans-media unmanned aerial vehicle device of claim 4, wherein four rotating rods are provided which are distributed in a cross shape.

13. The trans-media unmanned aerial vehicle device of claim 5, wherein four rotating rods are provided which are distributed in a cross shape.

14. The trans-media unmanned aerial vehicle device of claim 6, wherein four rotating rods are provided which are distributed in a cross shape.

15. The trans-media unmanned aerial vehicle device of claim 7, wherein four rotating rods are provided which are distributed in a cross shape.

16. The trans-media unmanned aerial vehicle device of claim 4, wherein the piston is connected with a power unit; the power unit comprises a piston aeroengine and a hydraulic system driven by the piston aeroengine; and the hydraulic system is controlled to push the piston to move.

17. The trans-media unmanned aerial vehicle device of claim 5, wherein the piston is connected with a power unit; the power unit comprises a piston aeroengine and a hydraulic system driven by the piston aeroengine; and the hydraulic system is controlled to push the piston to move.

18. A method for operating a trans-media unmanned aerial vehicle device, comprising:
  launching an unmanned aerial vehicle device from water toward air, the unmanned aerial vehicle device comprising:
    a housing, and
    a piston arranged in the housing and capable of reciprocating in the housing, wherein one end of the housing is provided with an opening; several flying wings are uniformly arranged in a circumferential direction of the piston; the flying wings are rotatably connected to a side of the piston facing the opening and configured to spread or retract; and under the pushing of the piston, the flying wings spread to an outside of the housing and retract back into the housing upon release of the piston, wherein the piston comprises a piston head, a piston tail, and a piston rod for connecting the piston head to the piston tail; and the piston tail is located outside the housing and is capable of closing the housing, wherein:
  when the unmanned aerial vehicle device rises to a certain height, the piston moves towards the outside of the housing relative to the housing, and the flying wings extend out of the housing and are spread;
  when entering the water, the flying wings are downwards retracted, and the piston moves towards the inside of the housing relative to the housing; the flying wings are retracted into the housing; and the unmanned aerial vehicle device freely falls into the water.

19. The method of claim 18, wherein when leaving the water, the unmanned aerial vehicle device is launched out of the water in a vertical state; and when entering the water, the unmanned aerial vehicle device falls into the water in the vertical state.

* * * * *